United States Patent [19]

Denney et al.

[11] Patent Number: 4,815,076
[45] Date of Patent: Mar. 21, 1989

[54] RECONFIGURATION ADVISOR

[75] Inventors: Richard L. Denney; Scott B. Guthery, both of Austin, Tex.

[73] Assignee: Schlumberger Technology Corporation, Houston, Tex.

[21] Appl. No.: 14,879

[22] Filed: Feb. 17, 1987

[51] Int. Cl.$^4$ .............................................. G06F 11/20
[52] U.S. Cl. ..................................... 371/11; 364/200; 364/422
[58] Field of Search ................ 364/422, 200 MS File, 364/513; 371/11

[56] References Cited

U.S. PATENT DOCUMENTS

| | | | |
|---|---|---|---|
| 3,787,816 | 1/1974 | Hauck | 371/11 X |
| 3,818,199 | 6/1974 | Grossman | 371/11 |
| 4,321,670 | 3/1982 | Timmons | |
| 4,398,272 | 8/1983 | Siebert | |
| 4,490,788 | 12/1984 | Rasmussen | |
| 4,531,204 | 7/1985 | Vanderschel | |
| 4,709,325 | 11/1987 | Yajima | 371/11 X |

Primary Examiner—Jerry Smith
Assistant Examiner—Steven G. Kibby
Attorney, Agent, or Firm—Cox & Smith

[57] ABSTRACT

A machine implemented process for advising on several alternatives for recovering from single or multiple component failures in a distributed process well-site instrumentation logging system which uses the rules, assumptions and constraints governing the hardware configurability of the well-site instrumentation system. The process locates and tests one or more reconfigurations for a failure scenario, and presents the possible reconfiguration scenarios in order of preference.

11 Claims, 1 Drawing Sheet

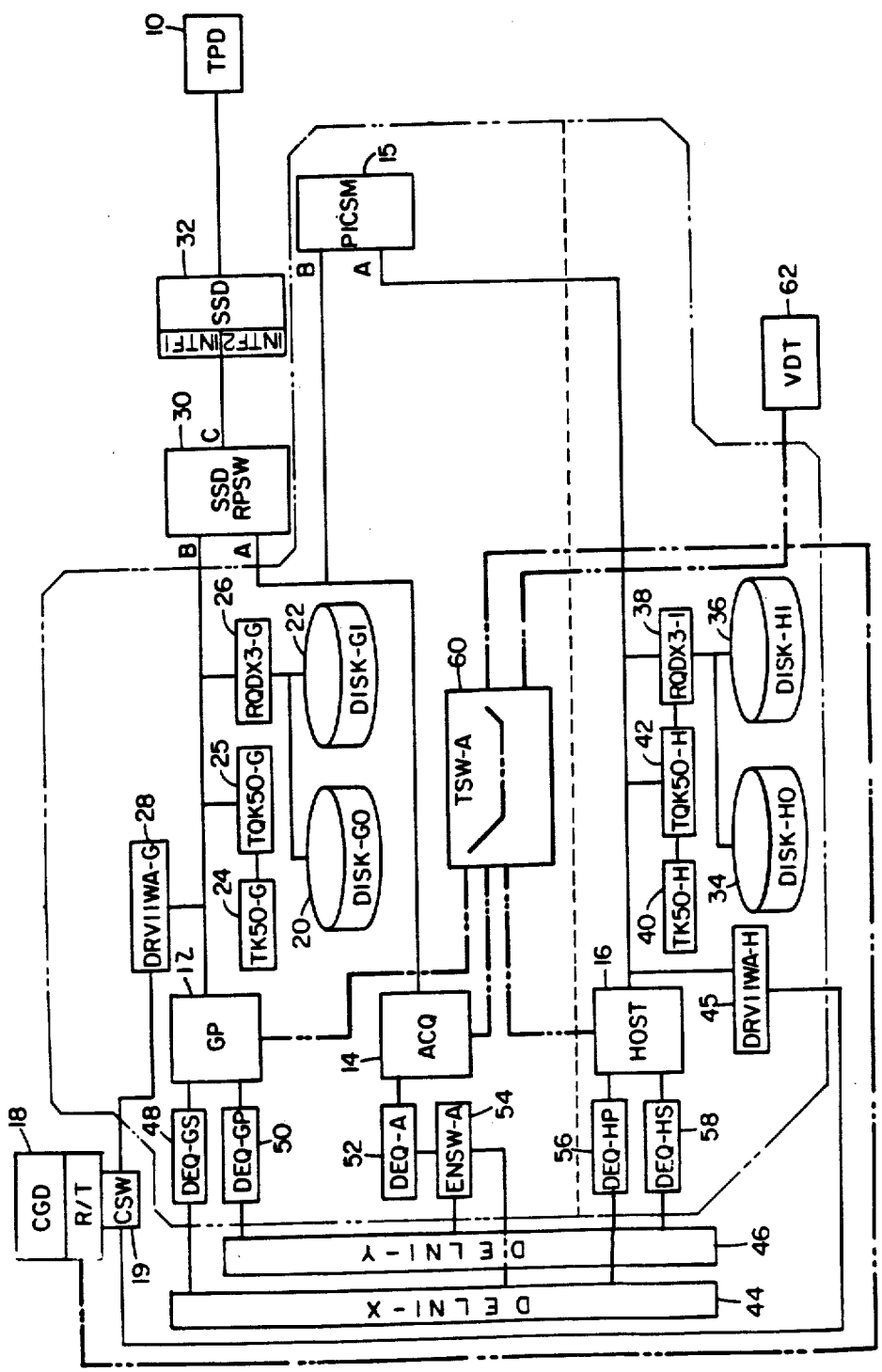

RECONFIGURATION ADVISOR

BACKGROUND OF THE INVENTION

1. Field of the Invention

The present invention relates to a method and system for advising on several alternatives for recovering from single or multiple point failures in computer systems, and specifically a method and system intended to assist field engineers in the task of recovering from single or multiple component failures in a well-site instrumentation logging system for logging wells.

2. Background

Computer systems typically achieve some degree of reliability by using hardware redundancy. In simplest terms, if portions of a hardware system are critical, redundant or mere image systems are used such that if one system or part of a system fails, the backup system may be used.

Although redundant systems are effective at achieving specified levels of reliability, redundant systems are costly. Thus, there have been efforts at designing systems which can achieve a high level of reliability without total hardware redundancy. One such system is the Basic CSUF System.

The Basic CSUF System is a well logging system utilizing computer hardware which achieves a high degree of reliability without complete hardware redundancy, thereby lowering the costs of the system. That is accomplished by designing the system to be reconfigurable. In other words, the system is designed using distributed computing such that the role of one processor can be shifted to another in the event the former processor fails. Each configuration of the hardware and software represents a distinct way of distributing the computational load of the well logging system.

When a single failure occurs in this system, however, it is usually not immediately apparent how one should reconfigure the system in order to recover. Multiple failures in the system make the task even more difficult because the effects of multiple failure may overlap or interact in complicated ways. The reconfiguration advisor of the present invention enables the operator to respond to single or multiple component failures quickly and effectively by advising the operator which configurations are possible and preferable given a failure scenario.

Various proposals, in general, have been made for using artificial intelligence techniques for various applications. For example, the paper by Marcus, McDermott and Wang "Knowledge Acquisition for Constructive Systems", IJCAI, Vol. 1, 637-39 (1985) describes SALT, a tool designed to assist with problem-solving strategies for an elevator system configurer. A paper by McDermott "R1; An Expert in the Computer Systems Domain", *Proceeding of the First Annual National Conference on Artificial Intelligence*, 269-271 (1980) describes an application of knowledge-based systems to the problem of hardware configuration. The input to the system is the customer's order and its output is a set of diagrams displaying the spacial relationships between the components on the order. Those diagrams are then used by the technician who physically assembles the system. A paper by Stengel, "Artificial Intelligence and Reconfigurable Control Systems," Sigart Newsletter, 51 (1985) describes research on an artificial intelligence program for the analytic and experimental investigation of reconfigurable control systems as a method to increase reliability in flight control systems. A paper by Griesmer, et al, "Yes/MVS: A Continuance Real Time Expert System", *Proceeding of the National Conference on Artificial Intelligence*, Vol. 1, 130-136 (1984) suggest a real time control of computer operating systems. Here, however, the system actually interacts with the hardware itself, a requirement given the real time nature of the system. A paper by Nelson, "Reactor: An Expert System For a Diagnosis and Treatment of Nuclear Reactor Accidents", *Proceeding of the National Conference on Artificial Intelligence*, 296-301 (1982) describes a knowledge based expert system under development called REACTOR, intended to assist operators in the diagnosis and treatment of reactor accidents. The knowledge base is described as containing two types of knowledge: function-oriented knowledge concerning the reactor system and event-oriented knowledge describing the expected behavior of the reactor under accident conditions.

Prior to the present invention, however, artificial intelligent techniques have not been applied to the field of error recovery in well-site instrumentation logging systems.

Well-site instrumentation logging systems typically have much higher component failure rates than other computer systems. Well-site logging system are generally carried on trucks or other similar transport means and, as a consequence, are subjected to abnormally severe physical abuse. Also, well-site logging systems are subjected to extreme environmental conditions ranging from freezing cold weather to extremely hot weather. As a result, such systems experience more repetitive component failures that other systems.

Yet, well-site logging systems must provide a generally higher degree of reliability than other systems. Well-site logging systems must remain fully operable and running for long periods of time without servicing. Further, because of the nature of logging operations, such systems must be able to handle higher data rates than other systems. Additionally, the high costs associated with drilling dictate that logging systems must be reconfigurable "on the fly", namely that they be capable of continuous operation without even slight interruptions and certainly without any loss of data or data processing capabilities.

SUMMARY OF THE PRESENT INVENTION

The reconfiguration advisor of the present invention, based on the use of a type of artificial intelligence software technology, uses the rules, assumptions, and constraints governing the hardware configurability of the well-site instrumentation system, namely the Basic CSUF System, or other hardware system, to develop possible reconfiguration alternatives, and then test those alternatives against the constraints of the system to arrive at one or more final alternatives for recovery. One of the problems faced in finding one or more valid reconfigurations for a failure scenario is the problem of searching among a large number of alternatives for those which satisfy the underlying rules, assumptions, and constraints of the hardware system despite the existing failures. The present invention utilizes logic programming to address that problem of knowledge representation and search. In particular, the present invention uses PROLOG, a commercially available system, to implement the necessary logic. Similar other systems, however, may be used. The criteria is a program that has the ability to generate alternatives and test performance to constraints. PROLOG is preferred because its representational power comes from its being based on first order logic.

The reconfiguration advisor of the present invention permits the rules, assumptions, and constraints of the hardware system, i.e. the Basic CSUF System, to be easily specified in first order logic. The logical programming system, i.e. PROLOG, is used to search for solutions which satisfy the several constraints.

The present application and invention enhances the ability to create an inexpensive, reliable, and manageable hardware system which can achieve a measure of reliability without redundancy. In particular, the present invention provides a means for engineering an inexpensive, reliable, and manageable well logging system.

These and other objects, features and advantages of the invention will become evident in light of the following detailed description, viewed in conjunction with the referenced drawings of a preferred reconfiguration advisor according to the present invention. The foregoing and following description of the invention is for exemplary purposes only. The true spirit and scope of the invention is set forth in the appended claims.

BRIEF DESCRIPTION OF THE DRAWING

The FIGURE is a schematic diagram of a Basic CSUF System useful in explaining the present invention.

DETAILED DESCRIPTION

The present invention will be described specifically in conjunction with its current primary application for use in conjunction with the Basic CSUF System. However, it will be appreciated that the present invention may be used with other systems which require a high degree of reliability without hardware system redundancy.

The figure illustrates a well-site instrumentation system for logging wells known as the Basic CSUF System. This system is described in detail in co-pending patent application Ser. No. 000,144, filed Jan. 21, 1981, entitled RECONFIGURABLE WELL LOGGING SYSTEM, owned by the assignee of the present invention. In this example, the system consists of three processor groupings. The three processor groupings have three identifiable functions. The first central processor unit 12 is a general processor which, with its associated peripheral components described below, is used specifically to generate the graphics for a graphic display terminal 18. Two disk storage units 20 and 22 are connected through disk controller 26 to processor 12. In this particular hardware configuration, a graphic interface 28 is used to interface with the color graphics display 18. Tape unit 24 and tape controller 25, of course, are used for data storage and retrieval.

A second central processor unit 14 is used for the data acquisition function and is connected through a switch 30 and interface 32 to a tool power drawer or unit 10. The standard service drawer and interface 32 receives data from a down-hole well-logging instrument (not shown) in conventional manner. As is readily seen in the diagram, that data from the down-hole instrument is fed through to the acquisition processor 14.

The third central processor unit is a "host" processor 16. Disk storage units 34 and 36 are connected through a disk controller 38 to the host processor 16. A tape unit 40 and tape controller 42, as in the case of general processor 12 above, are also connected to host processor 16. Processor 16 is also connected to color graphics display 18 through a graphics interface 45.

The three processors, 12, 14, and 16 are connected to communication networks 44 and 46 through standard communication interface devices 48, 50, 52, 56, and 58. That provides communication between the processors and permits distributed processing.

A switch 60 permits switching the three processors to either the color graphics display 18 or a second terminal 62. Switch 30 permits the switching of data from the down-hole tool between general processor 12 and acquisition processor 14. Switch 54 permits switching between the two networks 44 and 46.

In the present example, the software for this system will provide or is intended to provide a number of "images," namely various intended functions. In this example, those "images" are TAO which is a knowledge base providing various rules, conditions and executable programs; HOST, which is a collection of executable processes and which does the primary controlling for the system; GEN which is graphics environment software for the output devices; HI which provides functions such as windowing and mouse control, i.e. output terminal controls; and ACQ which provides the data acquisition functions. Those "images" or functions, of course, will vary with the particular hardware and software being utilized for the basic system.

In this example, in order to run each of those images, certain minimal hardware configurations are necessary. Also, in the present example, it is preferable to balance those "images" over the processors. In other words, each of the processors will be assigned sole responsibility for running one or more of the "images," and that assignment of responsibility will be based on the computational requirements of the system and the components available in each of the processor groupings.

The actual hardware configuration, of course, also includes the communications networks between the processor groupings, the data input section, graphics output devices, and means, i.e. switches, which permit the system to be reconfigurable in the event of a component failure.

The method of the present invention therefor begins with preparing logic statements under PROLOG, or other logic programming systems, which identify the processors and components which form the plurality of processor groupings together with the other hardware components which make up the configuration of the well-site instrumentation logging system. In short, as will be seen in the exemplary description which follows, the method of the present invention, in effect, builds a knowledge base for the particular system desired. In the present example, the three processor groupings would be: (1) central processor 12 with its associated graphics interface 28, tape unit 24, tape controller 25, disk drives 20 and 22, and disk controller 26; (2) acquisition processor 14; and (3) central processor 16 with its associated graphics interface 45, tape unit 40, tape controller 42, disk drives 34 and 36, and disk controller 38. The other hardware components which make up the configuration include the color graphics display 18, shared memory 15, display terminal 62, networks 44 and 46, primary interfaces 50 and 56, secondary interfaces 48 and 58, acquisition interface 52, switch 19 ("CSW"), switch 54 ("ENSW-A") switch 30 ("RPSW") and switch 60 ("TSW-A"). With respect to those switches, their standard or normal position in the configuration are also identified. Either as a portion of that step or as a next step, the manner in which the "images" are balanced across the processors must be identified, for example, here HOST and TAO run on processor 16 and its component grouping; ACQ runs on processor 14, and HI and GEN run on processor 12 and its component grouping.

Each system configuration, of course, will be governed by certain inherent or expressed rules, assumptions or constraints imposed by the hardware, the software, or a combination of both. In order that the method of the present invention may function, those rules, assumptions and constraints must be identified.

Therefore, the next step of the present invention is to prepare logic statements under PROLOG, or other similar systems, which identify the particular rules, assumptions, and constraints posed by the configuration of the system. Again, although those rules, assumptions, and constraints will vary depending on the particular hardware used (and the types of software used and the intended functions of the system) the following will describe the rules, assumptions and constraints applicable to the present system.

Referring to the present example, the main consideration in the generation of various reconfiguration alternatives is the distribution of software images across the several processors. "Candidate" or possible distributions or redistributions through reconfiguration are or should be generated in an order of most to least preferable. Therefore, the order of preference as to how to balance the images on the processors must be stated. That order becomes one of the underlying "rule sets" of the system. In the present example, preference over distribution of software images across processors is defined in terms such as:

Configurations which use shared memory (i.e. 15) are preferred over those that do not.

The more processors that a configuration uses, the better. This assures the lightest processing load possible per processor.

Software image ACQ must always have its own processor to insure that it receives real time response.

Simply "generating" the permissible image/processor pairs in the order of preference will not solve the reconfiguration problem. The other constraints of the system must also be addressed. The method of the present invention also "tests" the generated image/processor pairs against the other constraints of the system. This form of problem solving is referred to in the logic programming and artificial intelligence art as "generate and test". Once a reconfiguration has passed all tests it is reviewed by a set of rules which advise the field engineer as to what will be required to actually execute the reconfiguration, i.e. change the system from the current configuration to the indicated reconfiguration.

The following sections describe the tests an image/processor pairing must be able to pass in the present example in order for a reconfiguration to be viable. In the following test descriptions, terms in quotations will have their own expanded designation.

TEST 1: BOOTING A SET OF PROCESSORS

The set of processors given in a set of image/processor pairings must be bootable. In the present example, the acquisition processor 14 and a set of other processors are all bootable if there is some setting for ENSW-A switch 54 allowing the acquisition processor's "boot" to be serviced by either a processor that is already booted or by one of the rest of the processors in the set to be booted, and where the rest of the "set of processors are indeed bootable." Note that this is a recursive definition.

In the present example, some processor, other than the acquisition processor 14, and a set of other processors are all bootable if the processor can be "booted," and where the processor's boot is either (1) serviced by a processor that is already booted (2) serviced by one of the rest of the processors in the set to be booted, or (3) is booted locally, i.e. "boots" itself. The rest of the "set of processors in the set must also be bootable." This is a recursive definition.

DEFINITION: BOOT

A processor, in the present example, can "boot" local with its standard disk enable switch (not shown) set to "enabled", if the processor is not acquisition processor 14, and if the processor is "available," and if the disk equipment for the processor is "available."

The acquisition processor 14, can be "booted" over some network 44, 46, if the acquisition processor 14 is "available," and if the "preferred network equipment" for the acquisition processor is "available," and where, on this "preferred network," there is "primary network equipment" (50 or 56) of some other processor "available," where that other processor is among the list of processors which have been specified as potential boot servers, and that other processor can also "boot" itself locally.

A processor other than acquisition processor 14, in the present example, can be "booted" remote over the network, with its disk enable switch set to "disabled", if the processor is "available," and if the "primary network equipment" for the processor is available, and where there is a set of "secondary network equipment," on that same network 44 or 46 associated with the secondary interface 48 or 58 of some other processor, and where the other processor is among the list of processors which have been specified as potential boot servers, and where the other processor can "boot" itself local.

DEFINITION: PREFERRED NETWORK EQUIPMENT

This definition applies only to the acquisition processor 14, and imposes an order of selection over the network equipment used to boot the acquisition processor 14. The first preference is to use that network 44 or 46 to which the switch ENSW-A 54 is set in the current configuration that the system is in. This is preferred because it eliminates having to reset switch ENSW-A 54 and may also eliminate the need to reboot the acquisition processor 14. The second preference is to use the network 44 or 46 to which the switch ENSW-A 54 is not set in the current configuration of the system.

DEFINITION: PRIMARY NETWORK EQUIPMENT

The primary network equipment for any processor, other than the acquisition processor 14, is that network 44 or 46 associated with the primary deqna 50 or 56 of the processor.

DEFINITION: SECONDARY NETWORK EQUIPMENT

The secondary network equipment for any processor, other than the acquisition processor 14, is that network 44 or 46 associated with the secondary deqna 48 or 58 of the processor.

DEFINITION: AVAILABLE

A piece of equipment is said to be available if it has not been specified by the field engineer as being unavailable. A piece of equipment may be specified unavailable either because it is broken or because the field engineer simply does not wish for it to be used.

TESTS: GRAPHICS, DOWN-HOLE COMMUNICATIONS, SHARED MEMORY INITIALIZATION, HOSTING ABILITIES

Similar rules, assumptions and constraints are set for the graphics function, down-hole communications, initialization of the systems shared memory 15, and for the HOST software image. For example, the graphics function requires the use of TSW-A 60, CGD 18, CSW 19 and DRV11WA-G 28 when software image HI is running on processor GP 12. Alternatively it can use TSW-A 60 and display terminal 62 with reduced graphics functionality while running on processor GP 12 or on "host" processor "host" 16. For full graphics functionality while running on processor HOST 16 software image HI must have equipment TSW-A 60 CGD 18, CSW 19 and DRV11WA-H 45.

Down-hole communications requires software image ACQ have equipment SSD-RPSW 30, SSD 32, and TPD 10 "available," regardless of which processor it runs on, GP 12 or ACQ 14.

Shared memory 15 must be initialized by running appropriate initialization software (in the present example, two images known as SHMS and SHMM) on processors ACQ and HOST respectively, only if shared memory PICSM 15 is "available" and the image/processor pairing calls for its use.

For the software image HOST to function properly, it must have disk systems 20, 22 and 26 when it is run on processor GP 12 and disk systems 34, 36 and 38 when it is run on "host" processor 16.

TEST: SETTING OF SWITCHES CSW 19, TSW-A 60 AND SSD-RPSW 30

If the graphics device being used is a terminal 62, then switch CSW 18 will not be used. If, however, the graphics device being used is the CGD 18 then switch CSW 19 must be settable to that processor on which the software image HI is running.

Similarly, switch TSW-A 60 must be settable to that processor on which the software image HI is running.

Switch SSD-RPSW 30 must be settable to that processor on which the software image ACQ is running.

TEST: SOFTWARE IMAGE COMMUNICATIONS

Tests must be performed with respect to the processor communications networks 44 and 46, and communications via shared memory 15. In the present example, given a list of software images to be run on a reconfiguration, communication routes must be achievable between all images. For example, let [a,b,c] be the list of images, then communication routes a/b, a/c and b/c must be achievable. The establishment of communication routes take the following criteria into consideration:

Images SHMS and SHMM are used to initialize shared memory 15 and do not require communication routes with any other software images.

Communication between images on "host" processors 16 and acquisition processor 14 should be via shared memory 15 if possible. In this case the setting of switch ENSW-A 54 has no bearing on communications.

The default of communication is via the network 44 or 46.

If acquisition processor 14 is one of the processors involved, then communications must be possible over the network to which switch ENSW-A 54 is already set. If switch ENSW-A 54 has not already been set, then it can be reset as needed to establish communications.

Whatever communication routes are chosed, they must be supportable with the "availability" of the appropriate pieces of equipment: DELNI-X 44, DELNI-Y 46, DEQ-GS 48, DEQ-GP 50, DEQ-A 52, ENSW-A 54, DEQ-HP 56 and DEQ-HS 58.

Looking now at an example, assume the host computer 16 device for interprocessor communication 45 has failed together with disk system 34, 36, 38. The reconfiguration advisor of the present invention would present the operator with two possible reconfigurations of the system in light of the scenario:

*** Possible Reconfiguration One *** based on this list of broken equipment:
[DRV11wa_h,host_disks]
one can reconfigure the system like this:
acq on acq
--change → host on gp
--change → tao on gp
--change → hi on host
--change → gen on host
switch csw will not be used
leave switch ssd__rpsw set to acq
--action → reset switch tsw__a__processor to host
--action → reset switch tsw__a__device to vt220
--action → reset switch ensw__a to delni__y
--action → you need to reboot acq remote from gp over delni__y
already booted: gp local with disk enable switch set to enabled
--action → you need to reboot host remote from gp over delni__x
with disk enable switch set to disabled
communication routes for images:
--change → acq talks with host via decnet
--change → acq talks with hi via memory
--change → acq talks with tao via decnet
--change → acq talks with gen via memory
host talks with hi via decnet
host talks with tao via decnet
host talks with gen via decnet
hi talks with tao via decnet
hi talks with gen via decnet
tao talks with gen via decnet

*** Possible Reconfiguration Two *** based on this list of broken equipment:
[drv11wa_h,host_disks]
one can reconfigure the system like this:
acq on acq
--change → host on gp
--change → tao on gp
hi on gp
gen on gp
leave switch csw set to gp
leave switch ssd__rpsw set to acq
leave switch tsw__a__processor set to gp
leave switch tsw__a__device set to cgd
--action → reset switch ensw__a to delni__y
--action → you need to reboot acq remote form gp over delni__y -continued

*** Possible Reconfiguration Two ***

```
already booted: gp local with disk enable switch set to enabled
communication routes for images:
--change → acq talks with host via decnet
acq talks with h via decnet
--change → acq talks with tao via decnet
acq talks within via decnet
host talks with hi via decnet
host talks with tao via decnet
host talks with gen via decnet
hi talks with tao via decnet
his talks with gen via decnet
tao talks with gen via decnet
```

Items marked with "--change→" indicate differences between the current configuration of the system and the indicated reconfiguration. Those are the changes that will be taken care of by the reconfiguration advisor of the present invention. Items marked with "--action→" indicate actions that the operator will have to perform in order to take the system from its current configuration to the indicated configuration.

The "--action→" annotations give the operator an indication of how difficult and/or timely the indicated reconfiguration will be to set up. In this case, the first reconfiguration will require rebooting on two processors and the resetting of three switches whereas the latter requires rebooting of only one processor and resetting of a single switch. That makes the former reconfiguration a more difficult reconfiguration to execute than the latter.

Also, between the two, there is a trade-off between performance and functionality. In the first reconfiguration, the reconfiguration advisor of the present invention balances the running of software images across all three processors:

acq on acq
--change→host on gp
--change→tao on gp
--change→hi on host
--change→gen on host In order to do that, however, it is necessary to sacrifice the use of color graphics display 18 as the human interface in favor of less functional display terminal 62.
--action→reset switch tsw_a_device to vt220

In contrast, the second reconfiguration opts for the full functionality gained by using the color graphics display for the human interface:

leave switch tsw_a_device set to cgd but at the expense of degraded system performance; software images are now balanced across only two of the processors. The host processor 16 is completely unused:
acq on acq
--change→host on gp
--change→tao on gp
hi on gp
gen on gp In order to select from among the two reconfigurations, the difference in terms of performance, functionality, and difficultly of set up would be considered by the operator in light of the job being performed.

Thus, the method of the present invention provides a unique solution to the problem faced by field engineers in attempting to recover from single or multiple component failures in well-site instrumentation logging systems. In particular, the method of the present invention uses the rules, assumptions and constraints governing the hardware configurability of the well-site instrumentation system to develop one or more valid reconfigurations for a failure scenario, and presents those alternative reconfigurations in order of preference. The field engineer is now given a guide for recovery from the component failure.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

We claim:

1. A machine-implemented process for advising on several alternatives for recovering from single or multiple hardware component failures in a distributed processing well-site instrumentation logging system having a plurality of processors and associated pheripheral components forming a plurality of processor groupings, and having a plurality of software images to be run by said plurality of processor groupings comprising the following process steps:

(a) identifying the processors and components forming the plurality of processor groupings together with the other hardware components which make up the configuration of the well-site instrumentation logging system;
   (b) identifying the particular rules, assumptions, and constraints posed by the configuration of the well-site instrumentation logging system;
   (c) identifying any preference information concerning the configuration;
   (d) establishing, in order of preference, reconfiguration scenarios possible under the particular rules, assumptions and constraints of the system for each probable single or multiple hardware component failure;
   (e) testing those possible reconfiguration scenarios against the rules, assumptions and constraints of the system; and
   (f) displaying the permissible reconfiguration scenarios in order of preference.

2. The process of claim 1 comprising the additional steps of:

(g) selecting one of the possible reconfiguration scenarios for implementation according to operator input, and
   (h) displaying those actions that must be taken by the operator in order to implement the selected reconfiguration.

3. The process of claim 2 wherein said preference information identified at step (c) includes a preference for using as many processors as possible in a configuration.

4. The process of claim 2 wherein said preference information identified at step (c) includes a preference for running that software image dedicated to data acquisition on a single processor.

5. The process of claim 2 wherein said preference information identified at step (c) includes a preference for using any memory device capable of being shared between processors.

6. The process of claim 2 wherein step (e) includes testing whether each software image which is to run in a particular processor can be either (1) booted locally to that processor or (2) loaded into that processor by another processor either already booted or to be booted in the particular reconfiguration.

7. The process of claim 2 wherein step (e) includes testing whether communication paths exist between all software images in any particular reconfiguration.

8. A machine implemented process for advising an operator as to one or more possible reconfigurations of a reconfigurable well-logging data acquisition system wherein the reconfigurable system includes an acquisition processor, a general processor communicating with a first disk storage unit, a host processor communicating with a second disk storage unit, a two-position data acquisition switch enabling data from downhole instrumentation to be received by either the acquisition processor or the general processor, a shared memory accessible by both the acquisition processor and the host processor, a human interface software image, at least one data acquisition software image, at least one graphics software image, a software image performing the reconfiguration advising, at least one operating system software image, a video display terminal driven by the human interface software and capable of being linked to any one of the three processors, a color graphics display terminal driven by the human interface image and graphics software image and capable of being linked to either the general processor or the host processor, and two communications networks each connected to both the host and general processors and each selectively connected to the acquisition processor comprising the steps of:

(a) identifying the remaining available components of the system, after a component failure, via operator input;

(b) generating a reconfiguration scenario which distributes the software images across the remaining available processors;

(c) testing whether communications paths exist which enable the software images to be booted onto the appropriate processor in accordance with the reconfiguration scenario;

(d) testing whether communications paths exist between all of the software images residing in the processors in accordance with the reconfiguration scenario;

(e) testing whether means are available to (1) operatively connect the video display terminal or color graphics display terminal to that processor running the human interface software image and (2) connect the downhole instrumentation to that processor running the acquisition software image;

(f) if a reconfiguration scenario passes the above tests, outputting instructions to the operator as to what actions must be taken in order to attain that particular reconfiguration.

9. The process of claim 8 wherein alternative reconfiguration scenarios in accordance with step (b) are generated, tested according to steps (c) and (d), and displayed to the operator in accordance with the following criteria in descending preferential order: (1) the shared memory between the acquisition processor and the host processor is utilized, (2) no available processor is utilized, and (3) the data acquisition software image resides in a single processor.

10. The process of claim 9 wherein scenarios are tested for bootability by a recursive rule which states that a processor is bootable if that processor (1) can be booted locally from a disk, (2) can be booted by a processor already booted, or (3) can be booted by a second processor to be booted according to the scenario and where the second processor is also bootable.

11. The process of claim 10 wherein alternative reconfiguration scenarios are also generated and displayed in accordance with a preference to utilize the communications network already switched to the acquisition processor.

* * * * *